United States Patent
Dietrich et al.

[11] Patent Number: 6,059,076
[45] Date of Patent: May 9, 2000

[54] DRIVE FOR AN ELECTRICALLY ACTUATABLE VEHICLE BRAKE

[75] Inventors: Johannes Dietrich, Gilching; Bernd Gombert, Grafrath; Markus Grebenstein, Munich, all of Germany

[73] Assignee: Deutsches Zentrum für Luft- und Raumfahrt e.V., Bonn, Germany

[21] Appl. No.: 08/919,230

[22] Filed: Aug. 28, 1997

[30] Foreign Application Priority Data

Jun. 16, 1997 [DE] Germany .................. 197 25 372

[51] Int. Cl.[7] ........................................ B60T 8/02
[52] U.S. Cl. .................................. 188/156; 188/162
[58] Field of Search .................. 303/1, 20; 188/156, 188/157, 71.1, 72.7, 72.8, 162

[56] References Cited

U.S. PATENT DOCUMENTS

| | | | |
|---|---|---|---|
| 4,658,939 | 4/1987 | Kircher et al. | 188/72.8 |
| 4,793,447 | 12/1988 | Taig et al. | 188/72.1 |
| 4,809,824 | 3/1989 | Fargier et al. | 188/162 |
| 4,860,859 | 8/1989 | Yamatoh et al. | 188/156 |
| 4,944,372 | 7/1990 | Taig | 188/156 |
| 5,107,967 | 4/1992 | Fujita et al. | 188/156 |
| 5,829,557 | 11/1998 | Halasy-Wimmer | 188/162 |

*Primary Examiner*—Matthew C. Graham
*Attorney, Agent, or Firm*—Browdy and Neimark

[57] ABSTRACT

To form the drive for an electrically-actuatable vehicle brake whose frictional elements can be pressed against a brake disk (38) with the aid of an electric motor (4), the electric motor (4) is connected, by way of a spindle gear that acts, with axial guidance and protection against relative rotation, in the direction of displacement of the frictional elements, to a brake piston (24), which is seated to be axially displaceable and acts on the frictional elements. A pitch-true, planetary-roller threaded (SPWG) spindle (12) known per se is used as the spindle gear, the spindle comprising a spindle shaft (16), a spindle nut (14) encompassing this shaft, and a plurality of barrel or roller bodies (28) disposed between the two, the bodies being provided with grooved profiles (29) that fit the spindle shaft (16). The barrel or roller bodies (28) are seated by a plurality of guide rings (30) or a guide body (30') and bearings (18, 20) disposed between them. The barrel or roller bodies (28) are disposed with fixedly-predetermined spacing relative to the spindle nut (14) and one another.

20 Claims, 7 Drawing Sheets

DRIVE FOR AN ELECTRICALLY ACTUATABLE VEHICLE BRAKE

BACKGROUND OF THE INVENTION

1. Technical Field of the Invention

The invention relates to a drive for an electrically-actuatable vehicle brake.

2. Prior Art

DE 195 43 098 C2 describes an electrically-actuatable vehicle brake. In this known brake system, the electrically-actuatable vehicle brake is embodied as a disk brake whose brake shoes can be pressed against the brake disk with the aid of an electric motor serving as an electric drive. Moreover, by way of a spindle drive in the form of a planetary-roller threaded spindle known from DE 37 39 059 and disposed in the direction of displacement of the frictional elements, the electric motor is connected to a piston that is seated to be axially displaceable and acts on the brake shoe.

This known planetary-roller threaded spindle has low frictional coefficients, and permits a high force transmission, so the force required for actuating vehicle brakes can only be attained in one gear stage. Due to its function principle, however, a disadvantage of this spindle drive is that the transmission of the tangential forces from the spindle shaft to barrel or roller bodies and from these bodies to the spindle shaft is affected by slip. Thus, the known planetary-roller threaded spindle has an imprecisely-defined pitch and, consequently, no constant force transmission.

For operating a brake, however, the force with which brake shoes are pressed against a brake disk must be known. If a spindle gear is used that is not pitch-true, neither the position nor the speed nor the force acting on the brake lining can be determined from the motor parameters such as current, torque, rpm and motor setting. Consequently, to determine such values as are necessary for a control/regulation, additional sensors and evaluation units are required, which are costly on the one hand and, on the other hand, are associated with additional, complicated technology. Furthermore, the sensors in the region near the brake disk require space that is severely reduced there. Also, due to the proximity to the brake disk, high temperatures occur. The sensors would therefore have to be heat-resistant and free from temperature drift, or thermally shielded. This is, however, associated with complex technology and a high financial outlay.

Moreover, a few gear-related solutions have already been proposed for constructing a compact, electrically-actuatable brake actuator. None of the heretofore known proposals has succeeded in generating the high forces, with a constant pitch, that are required for actuating a brake from the rotational movement of the drive motor in the form of an electric motor.

OBJECT AND SUMMARY OF THE INVENTION

It is therefore the object of the invention to generate the forces needed for applying a brake, with an exactly-defined pitch, in the use of a spindle drive as a direct drive, that is, without an additional gear stage connected between the drive and the brake, or in the use of a spindle drive having an upstream gear with a low transmission rate.

In accordance with the invention, the object is accomplished with a drive for an electrically-actuatable vehicle brake according to the invention.

The use according to the invention of the pitch-true planetary roller-gear spindle (referred to hereinafter as SPWG spindle for the sake of simplicity) known from DE 195 40 634 C1 to convert a rapid rotational movement of an electric motor with a low torque into an axial movement with a very high force on a frictional lining of a vehicle brake permits a force transmission in one or two gear stages with constant pitch, and thus a conclusion about values such as force, position and acceleration at the frictional lining from the known, that is, measurable, values of the motor or parts of the spindle gear that are moved by a motor, such as current, step size, angular position, angular speed, angular acceleration and the like.

With the use according to the invention of the pitch-true planetary-roller threaded spindles known from the gear technology described in DE 195 40 634 C1, the brake-application force can be transmitted from an electric motor to a frictional lining of a brake actuator of an electrically-actuatable vehicle brake, pitch-true and therefore without slip.

To actuate the brake, a compact electric motor is used that has a low weight and small structural volume, and can therefore be provided directly at the wheel brake. In accordance with a preferred embodiment, the motor armature is connected, fixed against relative rotation, to the spindle nut of the SPWG spindle. The spindle shaft is secured against twisting, and is connected directly to the actuating piston of the brake, which presses the frictional lining against the brake disk.

The use of the SPWG spindle permits very small system pitches to be realized with simultaneous pitch trueness that, as dictated by principles, cannot be realized with other spindle types. For example, pitches in a range of 0.2 mm can be realized pitch-true. Hence, with a single transmission stage, the limited torque of the drive motor can be converted pitch-true into sufficient axial forces to apply the brake.

To increase the overall gear efficiency, and reduce the power loss and the initial breakaway torque/frictional moments of the bearings, it is advantageous as well as practical to provide a low-transmission, single-stage gear that has a low weight, but a high efficiency and a compact design, between the drive motor and the spindle gear.

In a further, advantageous embodiment of the invention, the electric motor is connected, fixed against relative rotation, to the spindle shaft, with the spindle nut acting on the brake piston. In this preferred embodiment of the invention, the inside diameter of the electric motor armature is dimensioned such that the spindle shaft can be accommodated in the armature, permitting an adjusting movement. Most importantly, in this advantageous embodiment of the invention, the structural length of the brake actuator is reduced, because the spindle shaft is disposed inside the rotor/armature.

In accordance with a further, preferred embodiment of the invention, the inside diameter of the electric motor rotor is dimensioned such that it can receive the spindle nut, which is connected, fixed against relative rotation, to the rotor. In this embodiment, the spindle shaft acts on the brake piston. The structural length of the brake actuator is also reduced in this embodiment.

In accordance with a further embodiment of the invention, the electric motor armature can be connected, fixed against relative rotation, to a gear whose drive shaft is again the spindle shaft. In this embodiment as well, the spindle nut acts on the brake piston, which can increase the overall efficiency of the brake actuator.

The drive of the invention has a particularly compact and lightweight design, and especially has a fixed transmission ratio. Most notably, the drive of the invention comprises only a few components, and can be advantageously equipped with sensors that may be necessary. Finally, the drive of the invention has a high efficiency because of the low frictional losses occurring inside it.

BRIEF DESCRIPTION OF THE DRAWINGS

The invention is described in detail below by way of preferred embodiments illustrated in the attached drawings. Shown are in.

DETAILED DESCRIPTION OF THE PREFERRED EMBODIMENT(S) OF THE INVENTION

Figure 1:
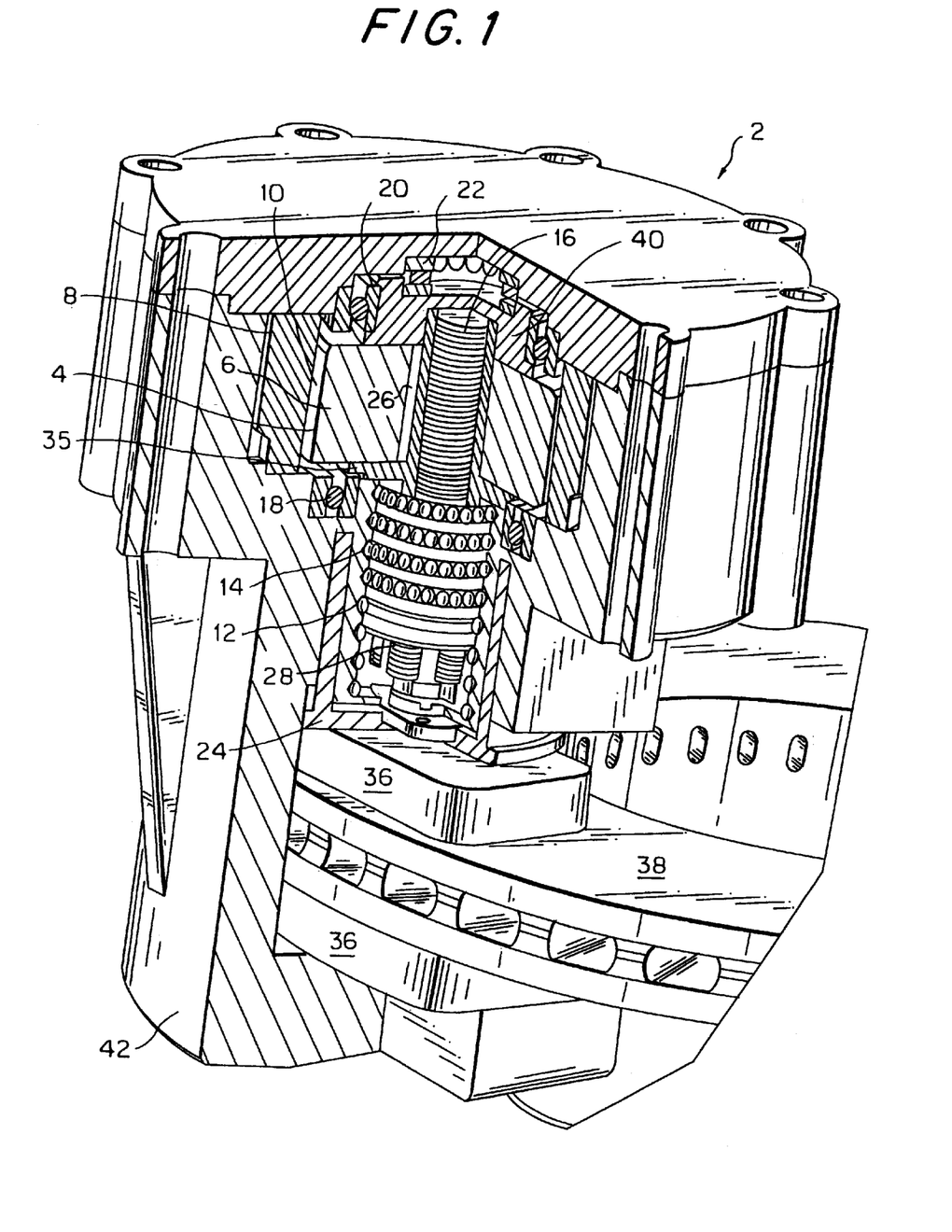
FIG. 1 a view in perspective of a partially cutaway brake actuator having a drive in accordance with the invention.

FIG. 1 shows a partially cutaway brake actuator indicated in its entirety by 2, with the upper part of FIG. 1 showing an electric motor 4 and the lower part showing a brake lining in the form of a frictional lining 36. The electric motor 4 has an armature 6 and a stand 8 and an air gap 10 between the two. By way of a pitch-true planetary-roller threaded (SPWG) spindle 12, the electric rotor 4 is in operational connection with a brake lining 36 that is secured to a brake piston 24. To save space, in the embodiment of FIG. 1 a spindle nut 14, not the spindle shaft, is driven by a spindle cover 35 connected fixedly to it. The spindle cover 35 is in turn connected, fixed against relative rotation, to the armature 6 of the motor 4.

The spindle cover 35 is simultaneously the axis of the electric motor 4 in the embodiment shown in FIG. 1. The spindle nut 14 and thus the armature 6 of the electric motor are supported at their motor-side end by means of a bearing 18, which is embodied as an angular ball bearing in FIG. 1. The cover 35, which is connected, fixed against relative rotation, to the armature 6, is fixedly connected to a counterflange 40. The counterflange 40 is in turn supported by means of a radial bearing 20 and an axial bearing (thrust bearing) 22, which is embodied as an axial roller bearing in the preferred embodiment of FIG. 1. This support is necessary, because all of the axial forces transmitted via the spindle cover 35 must be supported.

The brake actuator 2 having the embodiment shown in FIG. 1 functions as follows: The electric motor 4 drives the spindle nut 14 via the spindle cover 35. This causes the spindle shaft 16 fixed against relative rotation, and the brake lining secured to the brake piston 24, to be advanced and pressed against the brake disk 38, or the piston to be retracted from the disk. The wear occurring at the brake lining 36 can be compensated by an adjustment of the brake piston 24 with the frictional lining 36 attached to it, with respect to the spindle nut 14, by an adjustment path 26 indicated by a double-headed arrow in FIG. 1; the adjustment path 26 is in the order of magnitude of about 37 mm in FIG. 3. The stroke of the brake piston 24, and thus of the frictional lining 36 secured to the brake piston, can be up to 2 mm in the embodiment of FIG. 1, depending on the intensity of the actuation and the rigidity of the caliper 42.

In contrast to leading screws known per se, the SPWG spindle 12 comprises the spindle shaft 16 in the embodiment of FIG. 1; the spindle shaft is provided with a single- or multiple-turn, fine-pitch thread, and is surrounded by a plurality of barrel-shaped roller bodies 28. The roller bodies 28 are disposed, in arbitrary numbers and with uniform or non-uniform spacing, in planetary fashion. In the SPWG spindle 12 shown in FIG. 2, eight rollers are shown by way of example. The roller or barrel bodies 28 have a grooved profile that corresponds to the fine-pitch thread 17 of the spindle shaft 16.

Figure 2:
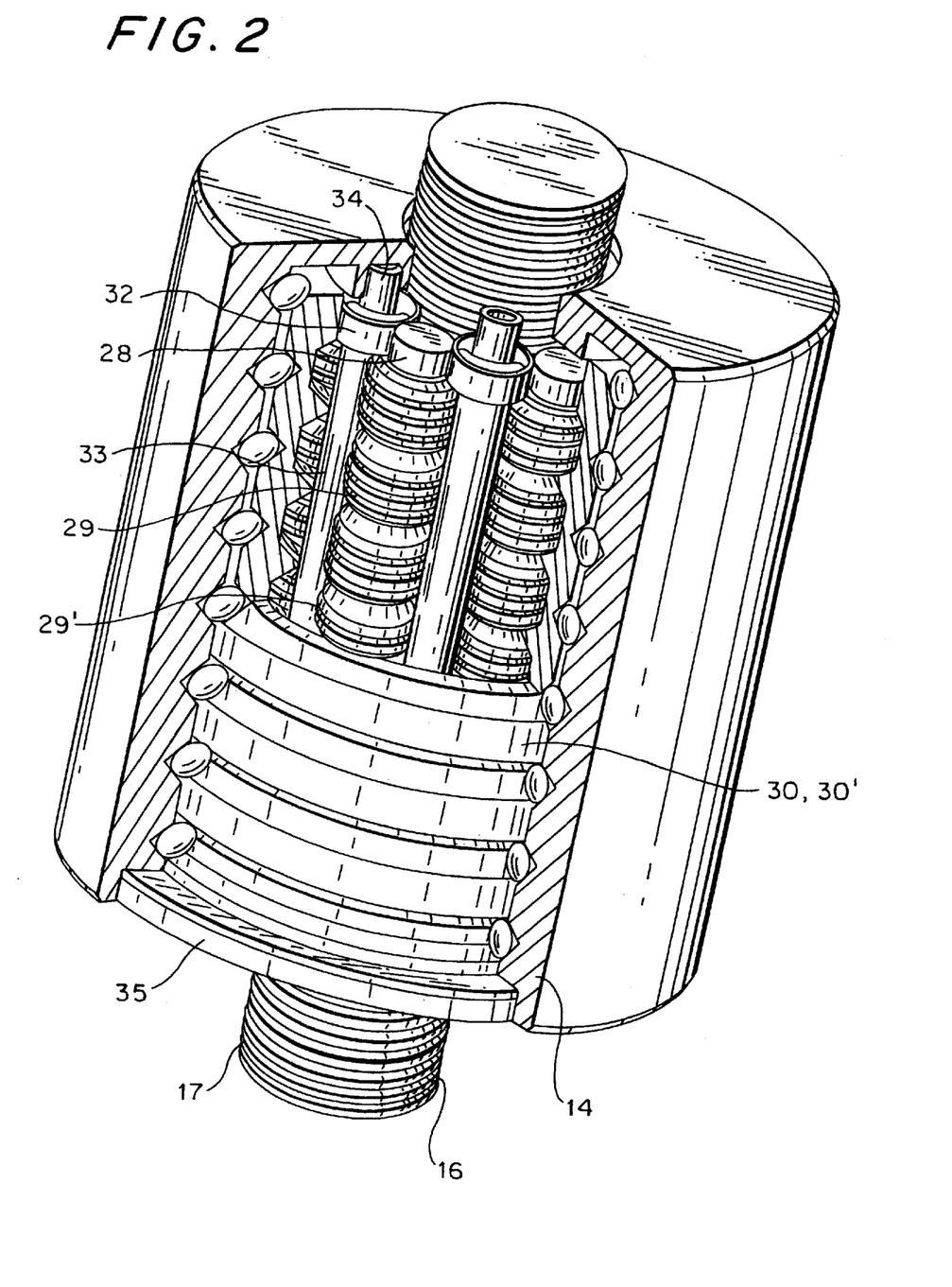
FIG. 2 a partially cutaway, pitch-true, planetary-roller threaded (SPWG) spindle of the actuator of FIG. 1.

A force introduced into the spindle shaft 16 is transmitted from the single- or multiple-turn, fine-pitch spindle-rod thread 17 to grooved profiles 29 embodied in sections and corresponding in number to the roller or barrel bodies 28.

By means of sliding contact, the force is transmitted to a plurality of guide rings 30 or a guide body 30' via guide grooves 29' provided in the roller or barrel bodies 28, the grooves having a V-shaped cross section and rounded or straight sides. The guide rings 30 or the guide body 30' are or is seated in the spindle nut 14 by ball- or roller-bearing rings, or according to the spherical- or barrel-body rotation principle, so no forces or torques occurring in the direction of rotation can be transmitted between the guide rings 30 or the guide body 30' and the spindle nut 14.

Ball bearings or roller bearings 32 are provided for contact seating of the roller or barrel bodies 28 and for maintaining a constant spacing between the roller or barrel bodies 28. The ball or roller bearings 32 are held directly in the spindle nut 14 by pins 33 and bushings 34, and the ball or roller bearings opposite the ball or roller bearings 32 are held in the spindle cover 35 by pins and bushings.

Because the above-described guide rings 30 or guide body 30' and ball or roller bearings 32 and 32' are provided, no slip can occur between the fine-pitch thread 17 of the spindle shaft 16 and the guide grooves 29' of the roller or barrel bodies 28. Likewise, pitch errors due slip or some other cause are precluded.

Figure 3:
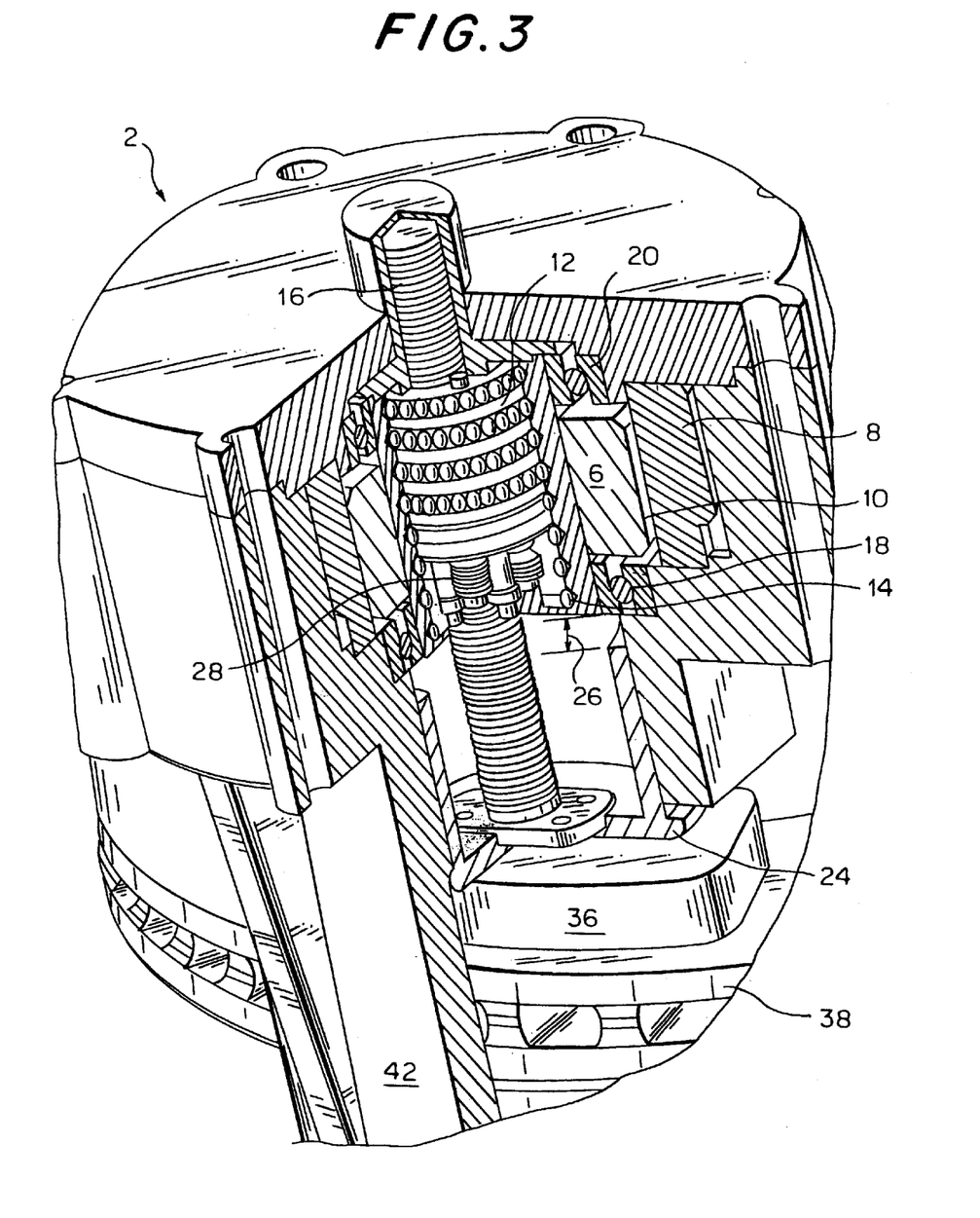
FIG. 3 a view in perspective of a partially cutaway, first alternative embodiment of the brake-actuator drive in accordance with the invention.

The first alternative embodiment of the drive of the invention for a brake actuator 2, which is shown in FIG. 3, has an electric motor 4 that is connected to a brake lining (frictional lining) 36. The electric motor 4, which has an armature 6 and a stand 8 and, between the two, an air gap 10, is also in operational connection with the brake lining 36 by way of a pitch-true, planetary-roller threaded (SPWG) spindle 12. In the first alternative embodiment, however, the spindle nut 14 is likewise disposed inside the armature 6 for the sake of saving space, and is connected to it so as to be fixed against relative rotation. Also in the first alternative embodiment, the spindle nut is driven, not the spindle shaft 16. Here the spindle nut 14 is simultaneously the axis of the electric motor 4. The spindle nut 14, and thus the armature 6 of the electric motor 4, are supported at their end on the side of the brake lining by a radial bearing 18, which is an angular ball bearing, and at the opposite end by a further radial bearing 20, also an angular ball bearing. (The axial forces can nevertheless also be supported by an additional axial bearing, as in FIG. 1.) This support is necessary, because all of the axial forces transmitted by way of the spindle nut 14 must be supported.

The function of the first alternative embodiment of a drive for the brake actuator 2 corresponds to that of the brake-actuator drive as described in conjunction with FIGS. 1 and 2. The wear of the brake lining 36 can also be compensated by about 37 mm, and the stroke of the brake piston 24 can be up to 2 mm, depending on the intensity of the actuation and the rigidity of the caliper 42. The SPWG spindle 12 is embodied exactly as described in conjunction with FIGS. 1 and 2. A force introduced into the spindle shaft 16 is also transmitted from the single- or multiple-turn, fine-pitch spindle-rod thread 17 to segment-like grooved profiles 29 of a plurality of roller or barrel bodies 28.

Moreover, forces or torques occurring in the direction of rotation can be transmitted between the guide rings 30 or the guide body 30' and the spindle nut 14 analogously to the embodiment described in conjunction with FIGS. 1 and 2. The contact seating of the roller or barrel bodies and the maintenance of constant spacing between the roller or barrel bodies 28 is effected in the same manner as described in connection with the embodiment of FIGS. 1 and 2. Again, because the guide rings 30 or the guide body 30' and the ball or roller bearings 32 and 32' are provided, no slip can occur between the spindle-rod fine-pitch thread 17 and the guide grooves 29' of the roller or barrel bodies 28. As in the first embodiment described in conjunction with FIGS. 1 and 2, pitch errors due to slip or some other cause are precluded.

Figure 4:
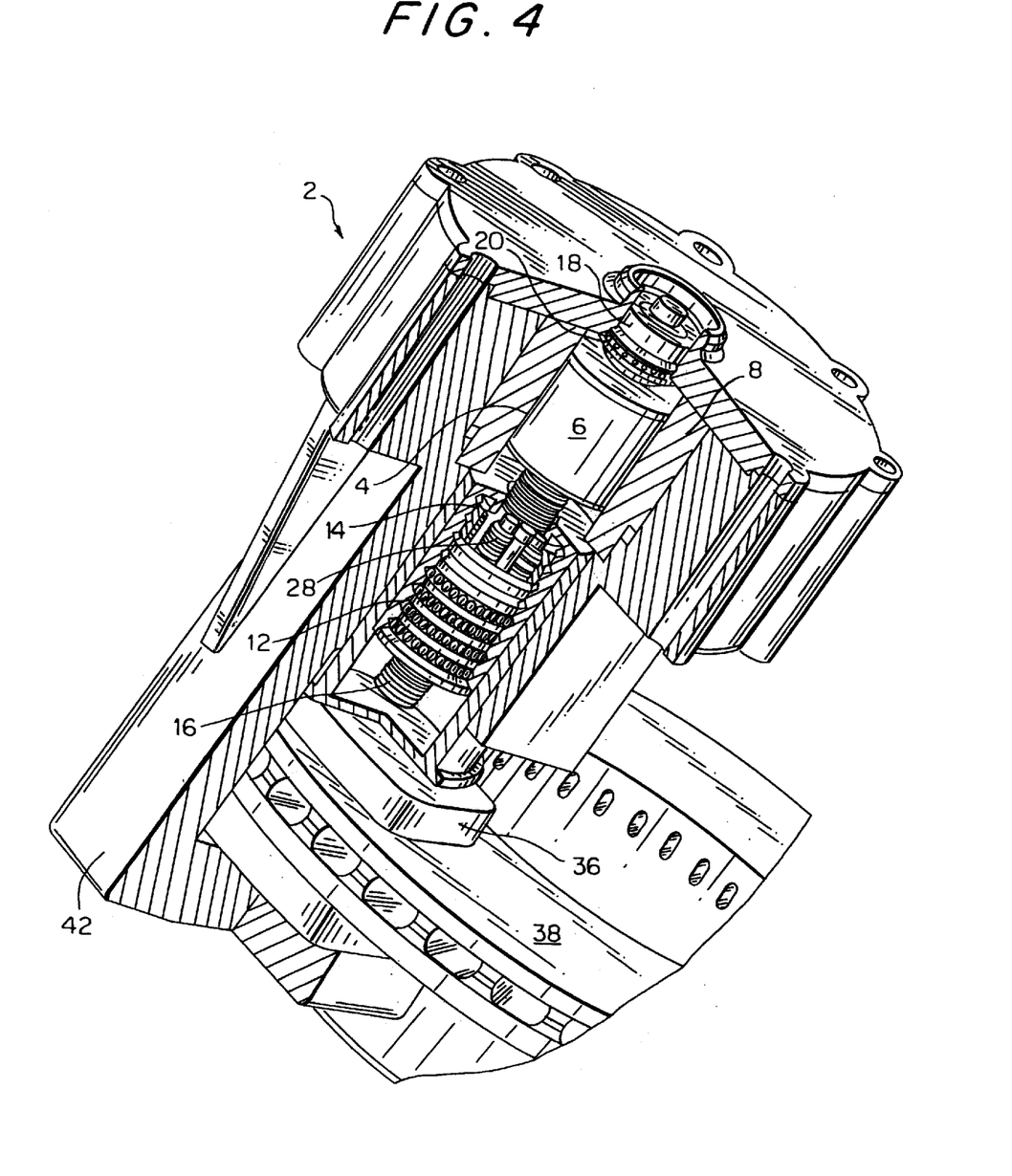
FIG. 4 a view in perspective of a partially cutaway, second alternative embodiment of the brake-actuator drive in accordance with the invention.

The second alternative embodiment of the drive of the invention for the brake actuator 2, which is shown in FIG. 4, differs from the first alternative embodiment described in conjunction with FIG. 3 in that, in the second alternative embodiment, the spindle shaft 16 is disposed inside the armature to reduce the rotating masses, and is connected to the armature so as to be fixed against relative rotation. In the second alternative embodiment, therefore, the spindle shaft 16 is driven, not the spindle nut 14. Furthermore, in the second alternative embodiment, the spindle shaft 16 is simultaneously the axis of the electric motor 4. In place of the spindle nut 14 of the first alternative embodiment, in the second alternative embodiment, the spindle shaft 16 and thus the armature of the electric motor are supported at their one end by means of a radial bearing 18, for example in the form of a ball bearing, and by means of an axial bearing 20, for example an angular ball bearing. Again, this support is necessary, because all of the axial forces transmitted via the spindle shaft 16 must be supported.

The brake actuator 2 having the drive according to the second alternative embodiment functions as follows: The electric motor 4 drives the spindle shaft 16, causing the spindle nut 14, which is fixed against relative rotation, and the brake lining 36 secured to the brake piston 24 to be advanced and pressed against the brake disk 38, or retracted from it. In contrast to the first alternative embodiment, the wear of the brake lining 36 is compensated through the adjustment of the brake piston 24 and the frictional lining 36 attached thereto, with respect to the spindle shaft 16, by an adjustment path 26 that is likewise in the order of magnitude of about 37 mm.

Because the SPWG spindle 12 is constructed exactly as in the above-described embodiments, the force introduced into the spindle shaft 16 is transmitted in the same way to segmented grooved profiles 29 of a plurality of roller or barrel bodies 28. Since the guide rings 30 or the guide body 30' are or is also seated in an analogous manner, no forces or torques occurring in the direction of rotation can be transmitted. Likewise, no slip can occur between the fine-pitch thread 17 of the spindle shaft 16 and the guide grooves 29' of the roller or barrel bodies 28; pitch errors due to slip are also precluded.

Figure 5:
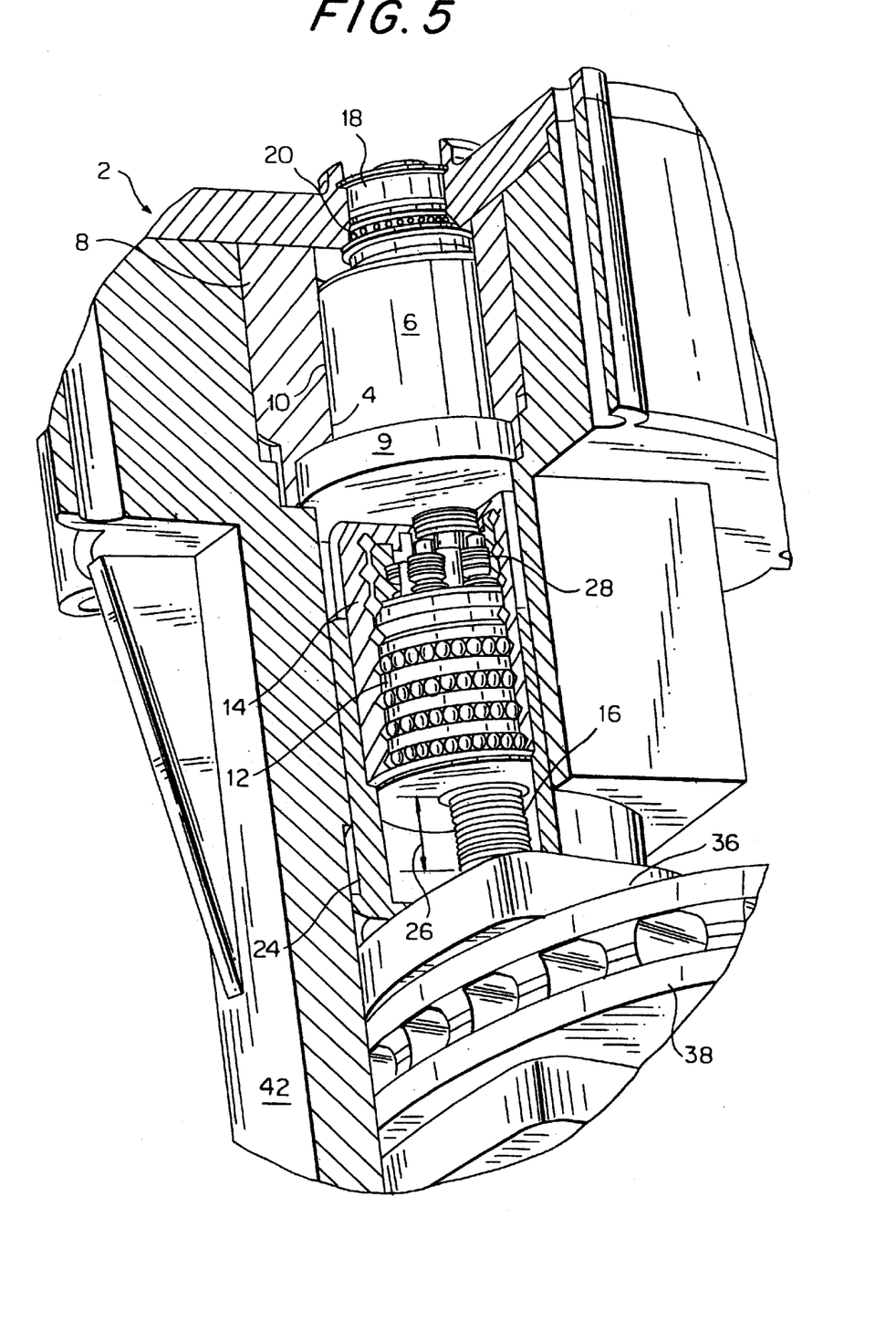
FIG. 5 a view in perspective of a partially cutaway, third alternative embodiment of the brake-actuator drive in accordance with the invention.

In contrast to the second alternative embodiment described in conjunction with FIG. 4, in the third alternative embodiment, which is shown in FIG. 5, the rotational movement of the electric motor 4 is reduced into a rotational movement of low rpm by the gear 9 for the purpose of improving efficiency. In the third alternative embodiment of FIG. 5, the spindle shaft 16, not the spindle nut 14, is driven via the gear 9. Here the axis of the drive shaft of the gear is simultaneously the axis of the electric motor. Aside from the differences outlined above, the third alternative embodiment corresponds to the second alternative embodiment described in conjunction with FIG. 4.

A drive for the brake actuator 2 that is designed in accordance with the third alternative embodiment differs in function in that the electric motor 4 drives the gear 9, which reduces the rotational movement of the electric motor 4. Moreover, the drive of the gear 9 is connected, fixed against relative rotation, to the spindle shaft 16. Thus, in the third alternative embodiment, the spindle nut fixed against relative rotation and the brake lining 36 secured to the brake piston 24 are advanced and pressed against the brake disk, or retracted from it. The design of the SPWG spindle 12 and its function are exactly the same as described in detail above for the first alternative embodiment.

Figure 6:
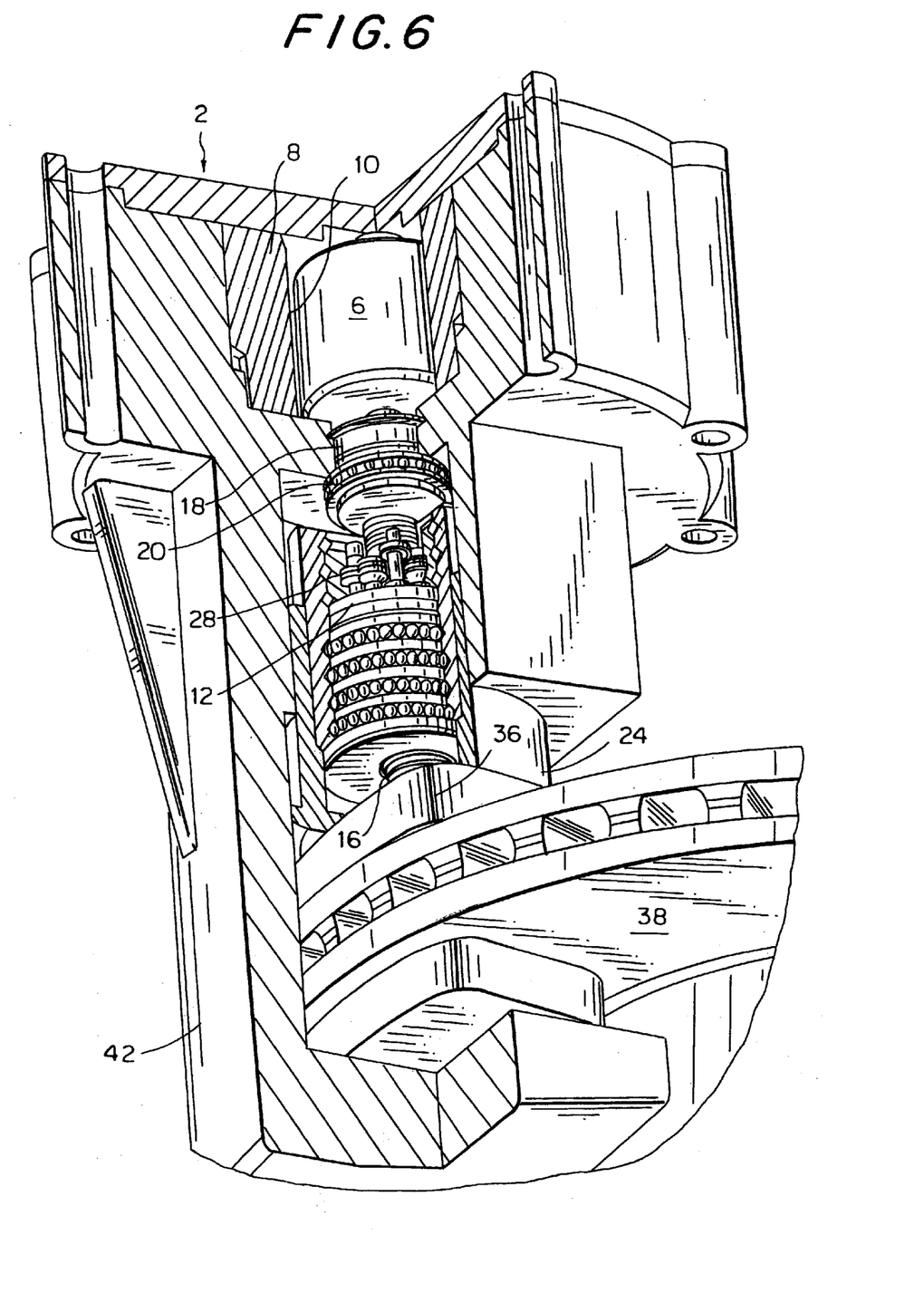
FIG. 6 a view in perspective of a partially cutaway, fourth alternative embodiment of the brake-actuator drive in accordance with the invention.

In the fourth alternative embodiment, which is shown in FIG. 6, the spindle shaft 16 is disposed inside the armature 6 for reducing the rotating masses, as described for the second alternative embodiment of FIG. 4, and is connected to the armature so as to be fixed against relative rotation. Also in the fourth alternative embodiment, the spindle shaft 16, and not the spindle nut 14, is driven.

The spindle shaft 16 is again simultaneously the axis of the electric motor 4. Between the spindle 12 and the electric motor 4, the spindle shaft 16, and thus the armature of the electric motor 4, are supported by a radial bearing 18, for example in the form of a ball bearing, and an axial bearing 20, which is also a ball roller bearing in the fourth alternative embodiment. Support is again necessary, because all of the axial forces transmitted via the spindle shaft 16 must be supported.

In addition, the function of the fourth alternative embodiment is the same as described in conjunction with the second alternative embodiment, for example. The design of the SPWG spindle 12 is also the same as in the above-described embodiments. Moreover, wear occurring at the brake lining is compensated in the same manner and to the same extent.

Figure 7:
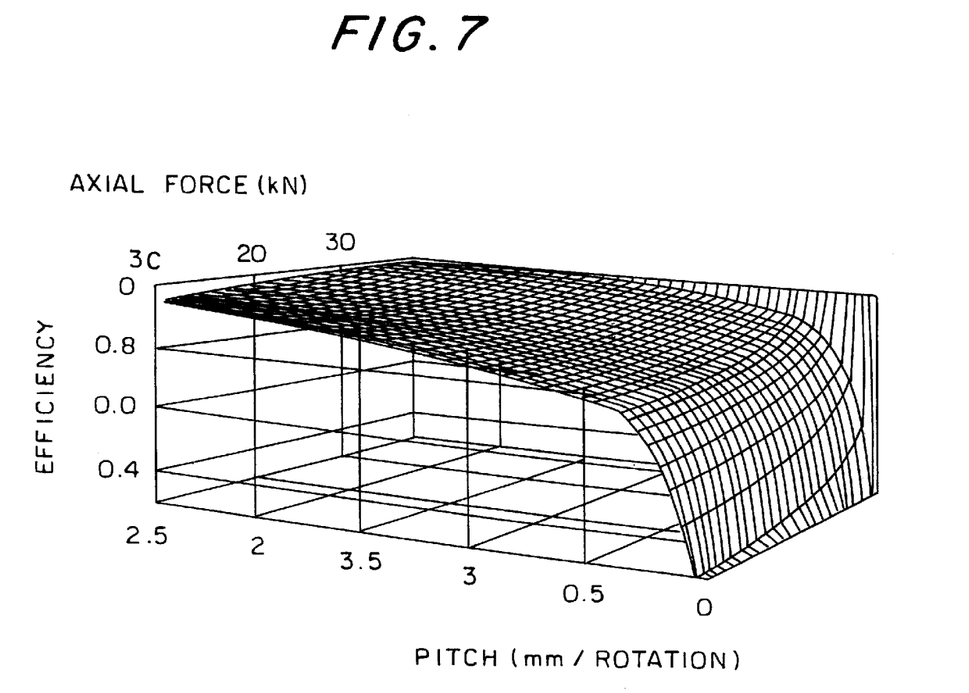
FIG. 7 a diagram for explaining an improvement in efficiency with the use of a gear according to FIG. 2.

In a three-dimensional graph on the axis extending diagonally to the left from the zero point, FIG. 7 shows the pitch in mm per rotation on the axis extending diagonally to the right from the zero point in FIG. 7 and, perpendicular to the pitch axis, the axial force in kN, and the efficiency on the vertically-extending axis in FIG. 7. As can be inferred from the graph of FIG. 7, an efficiency of about 0.96 is attained with a pitch of 2.5 mm per rotation.

We claim:

1. A drive for an electrically-actuatable vehicle brake whose frictional elements are operable to be pressed against a brake disk (38) with the aid of an electric motor (4), with the electric motor (4) being connected, by way of a spindle gear that acts, with axial guidance and protection against relative rotation, in the direction of displacement of the frictional elements, to a brake piston (24), which is seated to be axially displaceable and acts on the frictional elements wherein the spindle gear comprises a pitch-true, planetary-roller threaded (SPWG) spindle (12), the spindle comprising a spindle shaft (16) coaxial with an axis of the electric motor, a spindle nut (14) encompassing the shaft, and a plurality of barrel or roller bodies (28) disposed between the two, the bodies being provided with grooved profiles (29) that fit a thread (17) on the spindle shaft (16), with the barrel or roller bodies (28) being seated by guide means (30, 30') and bearings (18, 20) disposed between the guide means and the barrel or rollers bodies, and the barrel or roller bodies (28) being disposed with fixedly-predetermined spacing relative to the spindle nut (14) and one another.

2. The drive according to claim 1, wherein the spindle nut (14) simultaneously serves as an axis of the electric motor (4), and is disposed inside an armature (6) of the electric motor (4).

3. The drive according to claim 1, wherein a gear (9) is disposed downstream of an armature (6) of the electric motor (4).

4. The drive according to claim 1, wherein a ball bearing that is integrated into the spindle nut (14) and serves in the seating of the guide means (30, 30') with respect to the spindle nut (14).

5. The drive according to claim 4, wherein the bearing integrated into the spindle nut (14) operates according to the spherical-body rotation principle.

6. The drive according to claim 1, wherein the bearing integrated into the spindle nut (14) is a roller bearing.

7. The drive according to claim 6, wherein the bearing integrated into the spindle nut (14) operates according to a barrel-body rotation principle.

8. The drive according to claim 1, wherein, when the barrel or roller bodies are blocked, the rotational movement is converted into an axial movement by the spindle gear in the manner of a movement nut, with continuing constant pitch.

9. The drive according to claim 1, wherein a spherical-rotation spindle is provided between the guide means (30, 30') and the spindle nut (14).

10. The drive according to claim 1, wherein the barrel or roller bodies (28) maintain their angular position, unchanged, in the direction of rotation.

11. The drive according to claim 1, wherein the sides of the barrel or roller bodies (28) and sides of the fine-pitch thread of the spindle shaft (16) are provided with a roundness.

12. The drive according to claim 1, wherein the frictional lining (36) is guided by the spindle (12).

13. The drive according to claim 1, wherein the rotation energy of a rotating vehicle wheel can be stored and used for a pressing movement of the frictional lining (36) against the brake disk or brake drum.

14. The drive according to claim 1, wherein functions of the frictional lining (36), including position, speed, acceleration and force, can be controlled by determining functions of the electric motor (4), including current, voltage, angular position, angular speed, angular acceleration and torque, and functions of the spindle shaft, including angular position, angular speed, angular acceleration and torque.

15. The drive according to claim 2, wherein a ball bearing that is integrated into the spindle nut (14) and serves in the seating of the guide means (30, 30') with respect to the spindle nut (14).

16. The drive according to claim 15, wherein the bearing integrated into the spindle nut (14) is a roller bearing.

17. The drive according to claim 16, wherein, when the barrel or roller bodies are blocked, the rotational movement is converted into an axial movement by the spindle gear by a movement nut with continuing constant pitch.

18. The drive according to claim 17, wherein a spherical-rotation spindle is provided between the guide means (30, 30') and the spindle nut (14).

19. The drive according to claim 1, wherein the guide means are guide rings (30).

20. The drive according to claim 1, wherein the guide means is a guide body (30').

* * * * *